US008913048B2

(12) United States Patent
Lim et al.

(10) Patent No.: US 8,913,048 B2
(45) Date of Patent: Dec. 16, 2014

(54) SOURCE DRIVER CIRCUIT OF LIQUID CRYSTAL DISPLAY DEVICE

(75) Inventors: Hun Yong Lim, Daejeon-si (KR); Jung Hwan Choi, Daejeon-si (KR); An Young Kim, Daejeon-si (KR); Joon Ho Na, Daejeon-si (KR); Dae Seong Kim, Daejeon-si (KR); Dae Keun Han, Daejeon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 50 days.

(21) Appl. No.: 13/575,591

(22) PCT Filed: Mar. 12, 2010

(86) PCT No.: PCT/KR2010/001551
§ 371 (c)(1),
(2), (4) Date: Jul. 26, 2012

(87) PCT Pub. No.: WO2011/093550
PCT Pub. Date: Aug. 4, 2011

(65) Prior Publication Data
US 2012/0299903 A1 Nov. 29, 2012

(30) Foreign Application Priority Data
Jan. 29, 2010 (KR) ........................ 10-2010-0008474

(51) Int. Cl.
*G06F 3/038* (2013.01)
*G09G 3/36* (2006.01)
*G09G 5/00* (2006.01)

(52) U.S. Cl.
CPC .......... *G09G 3/3688* (2013.01); *G09G 2330/06* (2013.01); *G09G 2310/0291* (2013.01); *G09G 2330/026* (2013.01)
USPC .............................. 345/204; 345/87; 345/212

(58) Field of Classification Search
None
See application file for complete search history.

(56) References Cited

U.S. PATENT DOCUMENTS 6,275,210 B1 * 8/2001 Maekawa ........................ 345/98
(Continued)

FOREIGN PATENT DOCUMENTS

CN 1475838 2/2004
(Continued)

OTHER PUBLICATIONS

International Search Report of International Application No. PCT/KR2010/001551, dated Feb. 21, 2011.

(Continued)

*Primary Examiner* — Jason Olson
*Assistant Examiner* — Stephen T Reed
(74) *Attorney, Agent, or Firm* — Kile Park Reed & Houtteman PLLC

(57) ABSTRACT

Provided is a technology for preventing noisy data from being displayed before valid data is inputted when power is turned on in a liquid crystal display. A source driver circuit for a liquid crystal display includes: a power supply voltage input unit configured to divide a first power supply voltage and a second power supply voltage, such that a middle level of the second power supply voltage is lower than a level of the first power supply voltage; a power supply voltage comparison unit configured to compare division voltages inputted from the power supply voltage input unit, and output an output voltage of a high level in a time period in which the middle level of the second power supply voltage is higher than the level of the first power supply voltage; a Schmitt trigger configured to output the output voltage of the power supply voltage comparison unit as a reset signal while preventing a sensitive response to external environment; and a specific voltage supply unit configured to output a voltage of a specific level in a time period between the input of the reset signal from the Schmitt trigger and the input of a first gate start pulse.

7 Claims, 7 Drawing Sheets

(56) References Cited

U.S. PATENT DOCUMENTS

| | | | | |
|---|---|---|---|---|
| 6,937,233 | B2 * | 8/2005 | Sakuma et al. | 345/211 |
| 7,863,940 | B2 * | 1/2011 | Ou | 327/62 |
| 8,319,756 | B2 * | 11/2012 | Maone et al. | 345/204 |
| 2001/0020928 | A1 | 9/2001 | Yanagisawa et al. | |
| 2007/0109285 | A1 * | 5/2007 | Garverick et al. | 345/204 |
| 2009/0167746 | A1 * | 7/2009 | Yoon | 345/211 |

FOREIGN PATENT DOCUMENTS

| | | | |
|---|---|---|---|
| JP | 07-020439 | A | 1/1995 |
| JP | 2001-249320 | | 9/2001 |
| JP | 2003-69405 | | 3/2003 |
| JP | 2004-61892 | | 2/2004 |
| JP | 2006-24122 | | 1/2006 |
| JP | 2006-106293 | | 4/2006 |
| JP | 2008-102297 | | 5/2008 |
| JP | 2008-233913 | | 10/2008 |
| KR | 10-2005-0056469 | A | 6/2005 |
| KR | 10-2006-0047139 | A | 5/2006 |
| KR | 10-0855989 | | 9/2006 |
| KR | 10-2007-0001475 | | 1/2007 |
| KR | 10-2007-0042363 | A | 4/2007 |
| TW | 200500996 | | 1/2005 |
| TW | I287654 | | 10/2007 |

OTHER PUBLICATIONS

Written Opinion of the International Searching Authority for International Application No. PCT/KR2010/001551, dated Feb. 21, 2011.

* cited by examiner

SOURCE DRIVER CIRCUIT OF LIQUID CRYSTAL DISPLAY DEVICE

BACKGROUND OF THE INVENTION

1. Field of the Invention

The present invention relates to a technology for operating a source driver of a liquid crystal display, and more particularly, to a source driver circuit for a liquid crystal display (LCD), which can prevent an inferior image from being displayed by noisy data which is provided from a source driver to an LCD panel when power is turned on.

2. Description of the Related Art

In general, an LCD includes an LCD panel having pixel regions in which a plurality of gate lines and a plurality of data lines are perpendicularly arranged in a matrix form, a driver circuit which provides driving signals and data signals to the LCD panel, and a backlight which provides light to the LCD panel.

The driver circuit includes a source driver which provides data signals to the respective data lines of the LCD panel, a gate driver which applies gate driving pulses to the respective gate lines of the LCD panel, and a timing controller which receives display data and control signals, such as vertical and horizontal synchronization signals and clock signals, which are inputted from a driving system of the LCD panel, and outputs the received display data and control signals at a timing which is suitable for the source driver and the gate driver to reproduce an image.

FIG. 1 illustrates a power-on sequence of a conventional LCD panel.

When a first power supply voltage VCC rises up to a target level, a second power supply voltage VDD rises up to a middle level. At this time, a reset signal Reset begins to rise toward a target level, and the second power supply voltage VDD is maintained at a middle level for time t1 and then rises to a final target level. When time t2 elapses, the reset signal Reset reaches the target level. When time t3 elapses and time t4 starts, a first gate start pulse GSP is provided and then valid data begins to be provided through the timing controller and the source driver. The first power supply voltage VCC refers to a power supply voltage which drives a logic circuit of the source driver, and the second power supply voltage VDD refers to a power supply voltage which drives the source driver.

As described above, the two power supply voltages VCC and VDD are applied with time difference before the valid data is provided from the source driver to the LCD panel. In this case, an input terminal of an output buffer included in the source driver is floated and thus unclear noisy data is provided to the LCD panel. Accordingly, noisy image is displayed in time periods t2 and t3 as shown in FIG. 2(*a*), and a normal display operation is achieved after a time period t4 as shown in FIG. 2(*b*).

As such, when the conventional source driver is used, unclear noisy data is outputted on the LCD panel before valid data is outputted to the LCD panel. Noisy image displayed on the LCD panel gives a user an unpleasant feeling and also degrades the reliability of products.

SUMMARY OF THE INVENTION

Accordingly, the present invention has been made in an effort to solve the problems occurring in the related art, and an object of the present invention is to prevent the display of noisy inferior images by supplying a voltage of a specific level through an output buffer included in a source driver before valid data is provided from the source driver to an LCD panel after power is turned on.

In order to achieve the above object, according to one aspect of the present invention, there is provided a source driver circuit for a liquid crystal display, comprising: a power supply voltage input unit configured to divide a first power supply voltage and a second power supply voltage, such that a middle level of the second power supply voltage is lower than a level of the first power supply voltage; a power supply voltage comparison unit configured to compare division voltages inputted from the power supply voltage input unit, and output an output voltage of a high level in a time period in which the middle level of the second power supply voltage is higher than the level of the first power supply voltage; a Schmitt trigger configured to output the output voltage of the power supply voltage comparison unit as a reset signal while preventing a sensitive response to external environment; a specific voltage supply unit configured to output a voltage of a specific level in a time period between the input of the reset signal from the Schmitt trigger and the input of a first gate start pulse; and an output buffer unit configured to output valid data after outputting the voltage of the specific level, which is supplied from the specific voltage supply unit, to a data line of a liquid crystal display panel immediately after power is turned on.

In order to achieve the above objects, according to another aspect of the present invention, there is provided a source driver circuit for a liquid crystal display, comprising: a plurality of output switches configured to open output terminals of output buffers and corresponding data lines until valid data is inputted, immediately after power is turned on; a plurality of charge sharing switches configured to achieve a charge sharing by connecting the data lines until the valid data is inputted, immediately after the power is turned on; and a control unit configured to control switching operations of the output switches and the charge sharing switches.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
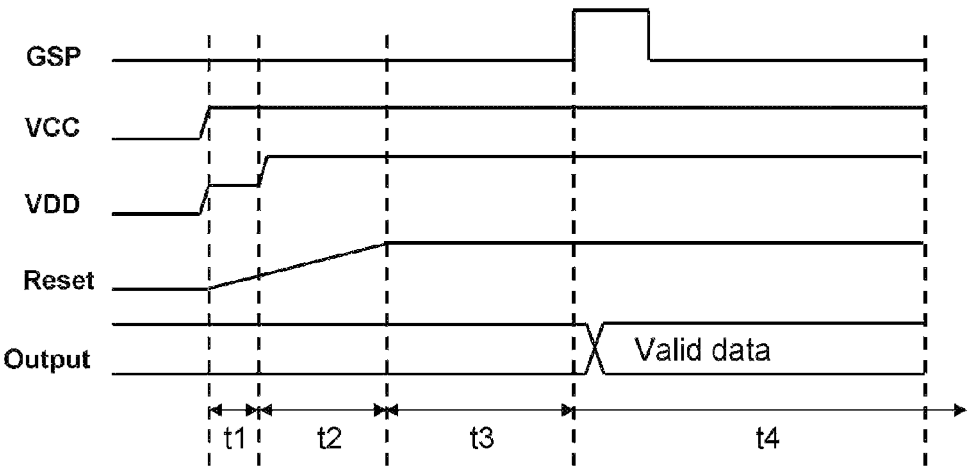
FIG. 1 is a waveform diagram illustrating a power-on sequence of a conventional LCD panel.
Figure 2:
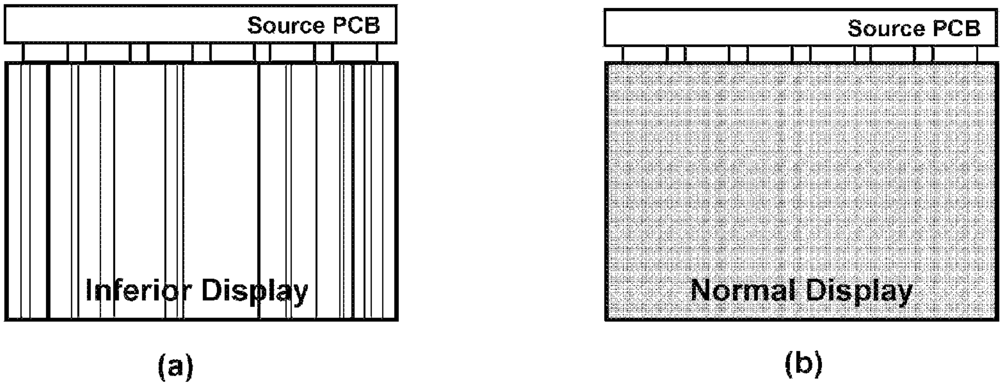
FIGS. 2(*a*) and 2(*b*) are exemplary views illustrating the display of a normal image after an inferior image is displayed upon an initial driving operation in a conventional LCD.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
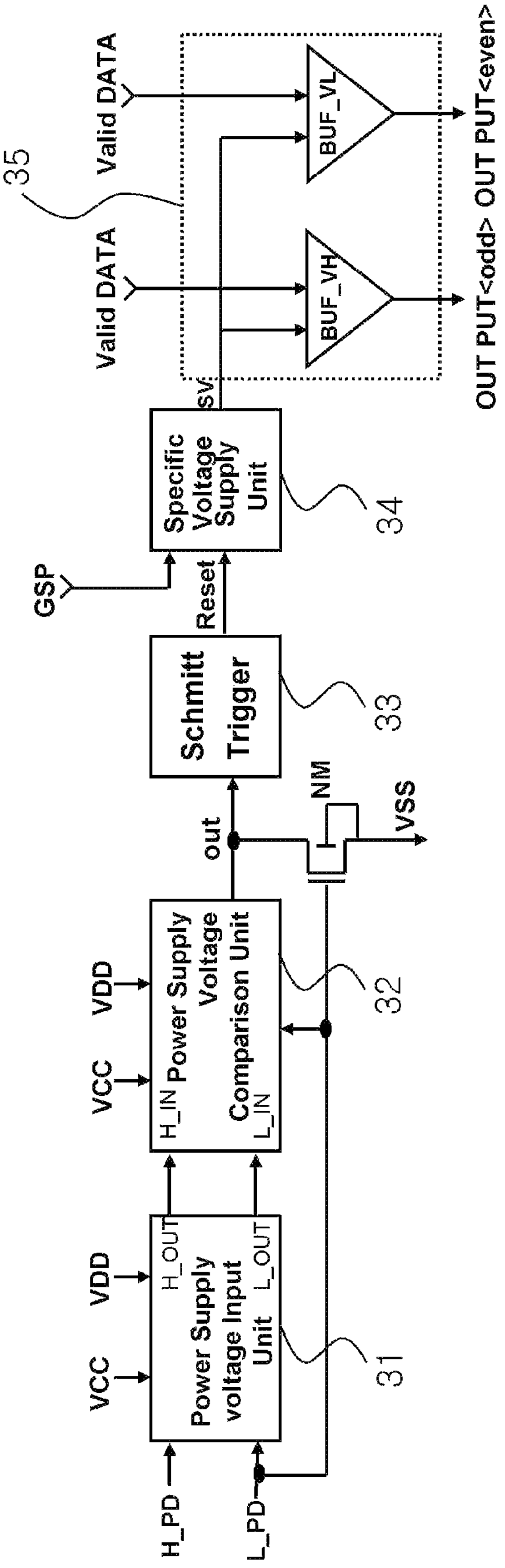
FIG. 3 is a block diagram illustrating a source driver circuit for an LCD in accordance with an embodiment of the present invention.

FIG. 3 is a block diagram illustrating a source driver circuit for an LCD in accordance with an embodiment of the present invention. Referring to FIG. 3, the source driver circuit includes a power supply voltage input unit 31, a power supply voltage comparison unit 32, a Schmitt trigger 33, a specific voltage supply unit 34, and an output buffer unit 35.

The power supply voltage input unit 31 is configured to divide first and second power supply voltages VCC and VDD, which have different levels, at a predetermined ratio.

Figure 4:
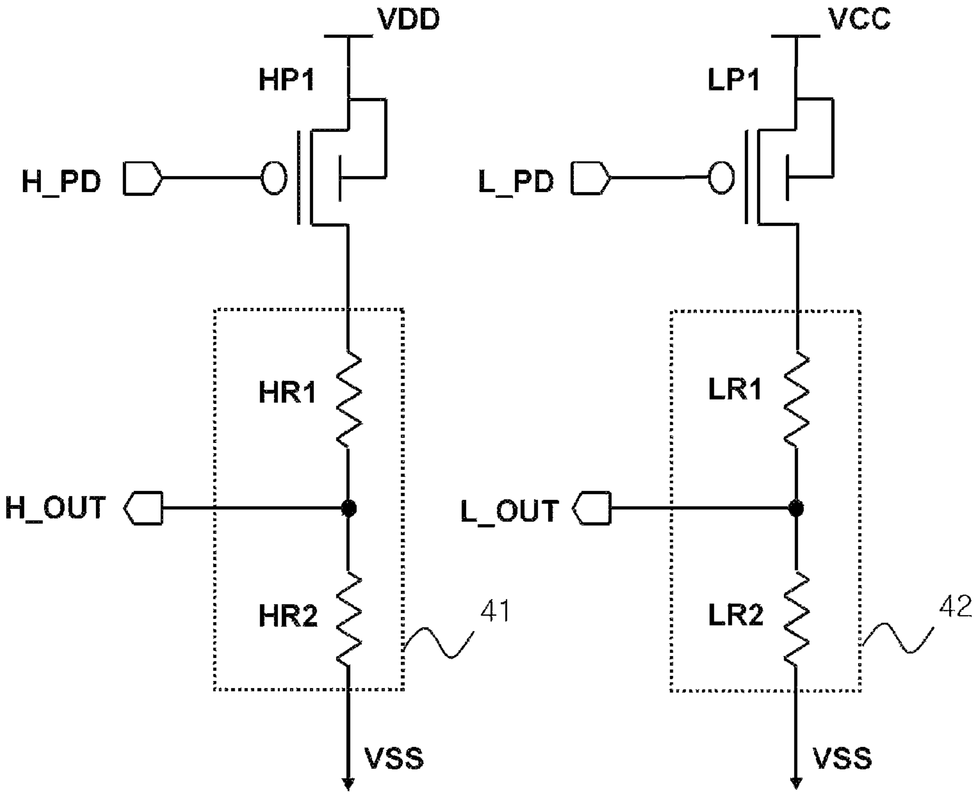
FIG. 4 is a detailed circuit diagram illustrating a power supply voltage comparison unit of FIG. 3.

FIG. 4 is a circuit diagram illustrating an implementation example of the power supply voltage input unit 31. The power supply voltage input unit 31 includes a switching PMOS transistor HP1, an upper division voltage output section 41, a switching PMOS transistor LP1, and a lower division voltage output section 42.

Figure 5:
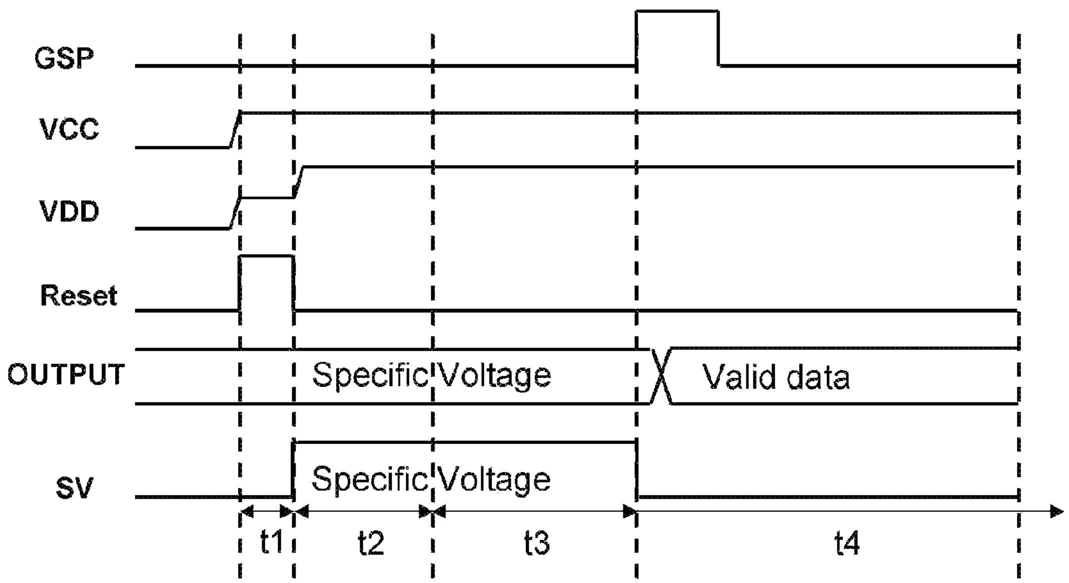
FIG. 5 is a waveform diagram of signals which are outputted from the respective units of FIG. 3.

As illustrated in FIG. 5, the PMOS transistor is turned on in response to an upper power-down signal H_PD in a time period t1 in which the second power supply voltage VDD is maintained at a middle level. Therefore, the second power supply voltage VDD is transferred to the upper division voltage output section 41 through the PMOS transistor HP1. The upper division voltage output section 41 divides the second power supply voltage VDD, which is supplied through the PMOS transistor HP1, by using two resistors HR1 and HR2 connected in series, and supplies an upper division voltage H_OUT as an upper input voltage H_IN of the power supply voltage comparison unit 32.

In addition, the PMOS transistor LP1 is turned on in response to a lower power-down signal L_PD in the time period t1. Therefore, the first power supply voltage VCC is transferred to the lower division voltage output section 42 through the PMOS transistor LP1. The lower division voltage output section 42 divides the first power supply voltage VCC, which is supplied through the PMOS transistor LP1, by using two resistors LR1 and LR2 connected in series, and supplies a lower division voltage L_OUT as a lower input voltage L_IN of the power supply voltage comparison unit 32.

Figure 7:
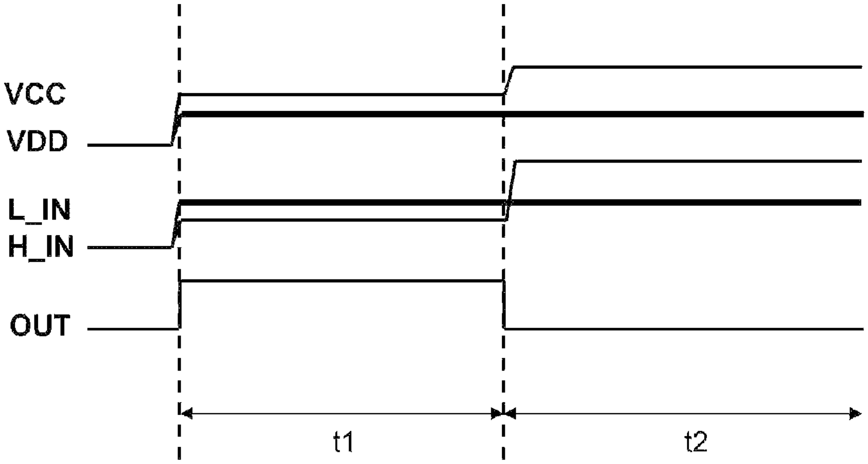
FIG. 7 is a waveform diagram of an input voltage and an output voltage of the power supply voltage comparison unit.

As illustrated in FIG. 7, at the beginning, the first power supply voltage VCC is lower than the middle level of the second power supply voltage. However, the lower input voltage L_IN supplied to the power supply voltage comparison unit 32 in the time period t1 is adjusted to be higher than the upper input voltage H_IN by appropriately setting the ratio of the resistors HR1 and HR2 of the upper division voltage output section 41 and the ratio of the resistors LR1 and LR2 of the lower division voltage output section 42.

The power supply voltage comparison unit 32 compares the lower input voltage L_IN with the upper input voltage H_IN, which are inputted from the power supply voltage input unit 31, and outputs an output signal OUT of a high level in the time period t1 in which the lower input voltage L_IN is higher than the upper input voltage H_IN (see FIG. 7).

Figure 6:
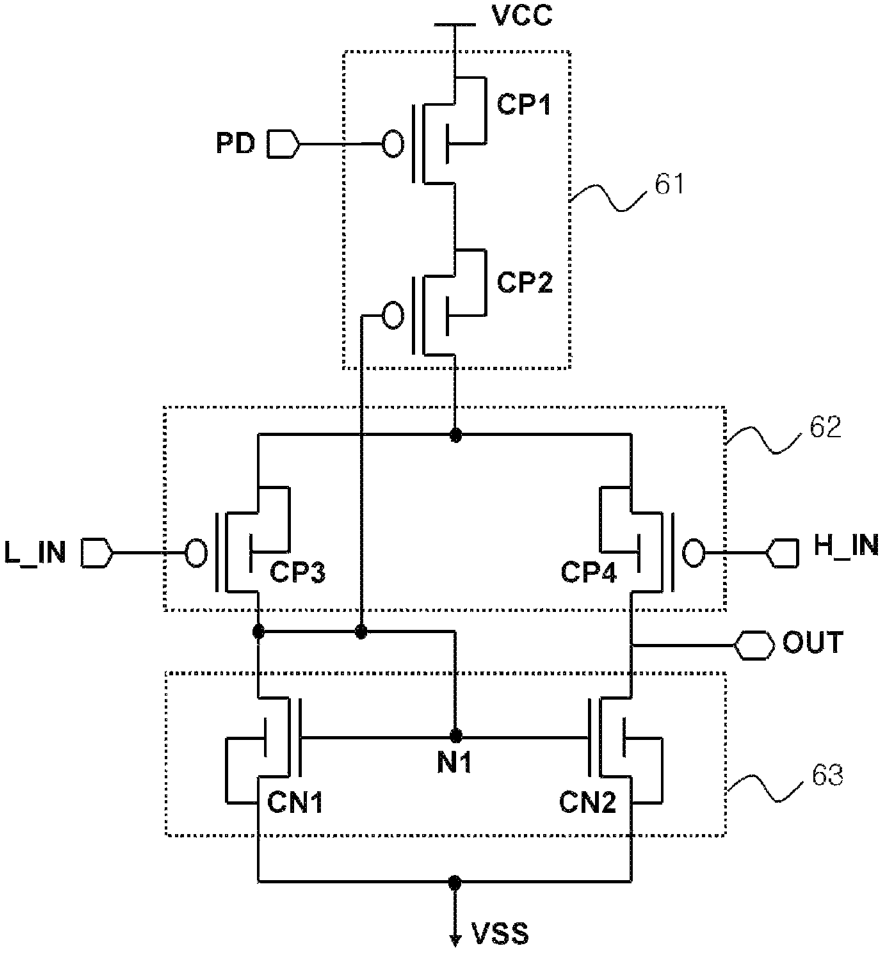
FIG. 6 is a detailed circuit diagram illustrating the power supply voltage comparison unit of FIG. 3.

FIG. 6 is a circuit diagram illustrating an implementation example of the power supply voltage comparison unit 32. As illustrated in FIG. 6, the power supply voltage comparison unit 32 includes an enable section 61, a comparison section 62, and a load section 63.

The enable section 61 includes PMOS transistors CP1 and CP2 connected in series. The PMOS transistor CP1 is turned on in response to the power-down signal PD of a low level, which is provided in the time period t1. Therefore, the first power supply voltage VCC is transferred to the comparison section 62 through the PMOS transistors CP1 and CP2.

The comparison section 62 includes PMOS transistors CP3 and CP4. The PMOS transistors CP3 and CP4 are supplied with the first power supply voltage VCC through a common source node N1, and supplied with the lower input voltage L_IN and the upper input voltage H_IN through the gates thereof, respectively.

As described above, since the lower input voltage L_IN is higher than the upper input voltage H_IN in the time period t1, the PMOS transistor CP3 is turned off, whereas the PMOS transistor CP4 is turned on.

The load section 63 includes NMOS transistors CN1 and CN2. Since the PMOS transistor CP3 is turned off, the node N1 is at a low level. Thus, the NMOS transistors CN1 and CN2 maintain a turned-off state.

Accordingly, as illustrated in FIG. 7, the output voltage OUT of a high level is outputted through the PMOS transistor CP4 of the comparison section 62.

Consequently, as illustrated in FIGS. 5 and 7, the power supply voltage comparison unit 32 outputs the reset signal Rest of a high level in the time period in which the first power supply voltage VCC rises to the target level and then the second power supply voltage VDD begins to rise to the final target level, that is, the time period t1 in which the second power supply voltage VDD is maintained at a middle level.

When the output voltage OUT generated from the power supply voltage comparison unit 32 is used as the reset signal Reset, the Schmitt trigger 33 maintains the stable waveform of the reset signal Reset, without responding to external environment (noise) too sensitively.

As illustrated in FIG. 5, the specific voltage supply unit 34 logically combines the reset signal Reset and a specific voltage SV, and outputs a specific voltage SV in time periods t2 and t3. The specific voltage SV outputted from the specific voltage supply unit 34 is supplied to the data line of the LCD panel through output buffers BUF1 and BUF2 of the output buffer unit 35. Although a pair of the output buffers BUF1 and BUF2 is provided in the output buffer unit 35 of FIG. 3, the output buffers may be provided as many as necessary.

Figure 8:
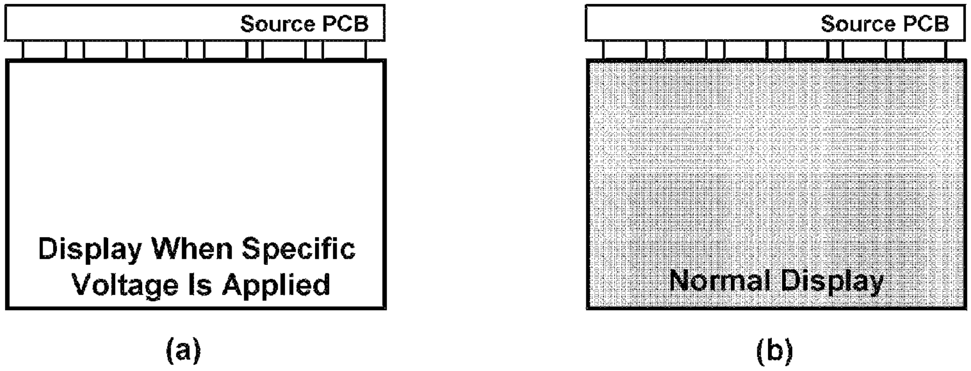
FIGS. 8(*a*) and 8(*b*) are exemplary views illustrating the display of a normal image both after and before valid data is inputted upon an initial driving operation in the LCD in accordance with the embodiment of the present invention.

Accordingly, as illustrated in FIG. 8(*a*), no unclear noisy images are displayed on the LCD panel.

Thereafter, the specific voltage SV is no longer supplied to the output buffers BUF1 and BUF2 of the output buffer unit 35 after a time period t4, and valid data is provided to the data line of the LCD panel through the output buffers BUF1 and BUF2.

Accordingly, as illustrated in FIG. 8(*b*), a normal image is displayed by the valid data.

The output buffers BUF1 and BUF2 of the output buffer unit 35 may receive the specific voltage SV and the valid data through a single input terminal with time difference, or may selectively receive the specific voltage SV and the valid data through separate switches.

Referring to FIG. 3, an NMOS transistor NM is turned on in response to the lower power-down signal L_PD after time periods t2 and t3 elapse, and mutes the output voltage OUT of the power supply voltage comparison unit 32 to the ground terminal VSS, so that the output voltage OUT is invalidated.

Figure 9:
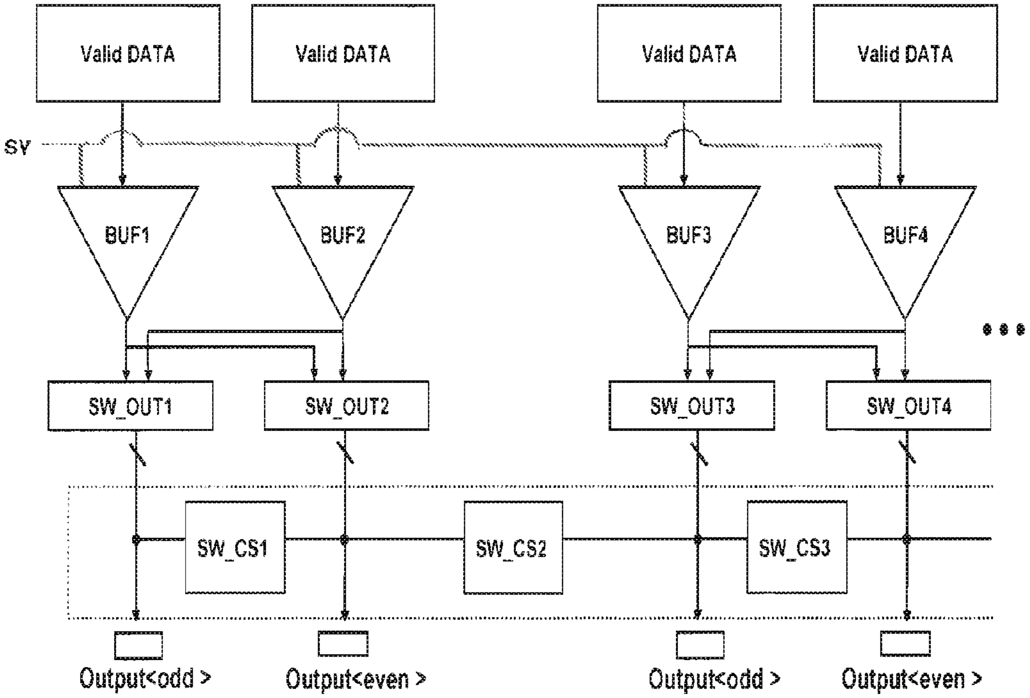
FIG. 9 is a block diagram illustrating a source driver circuit for an LCD in accordance with another embodiment of the present invention.

FIG. 9 is a block diagram illustrating a source driver circuit for an LCD in accordance with another embodiment of the present invention. Referring to FIG. 9, the source driver circuit includes output buffers BUF1, BUF2, BUF3 and BUF4, output switches SW_OUT1, SW_OUT2, SW_OUT3 and SW_OUT4, and charge sharing switches SW_CS1, SW_CS2, SW_CS3 and SW_CS4.

In a normal state, the output switch SW_OUT1 connects an output terminal of the output buffer BUF1 or an output terminal of the output buffer BUF2 to an odd output terminal OUTPUT<odd>, which is connected to a data line, under the control of a control unit such as the timing controller. In addition, the output switch SW_OUT2 connects the output terminal of the output buffer BUF1 or the output terminal of the output buffer BUF2 to an even output terminal OUTPUT<even>, which is connected to the data line, under the control of the control unit.

Likewise, the output switches SW_OUT3 and SW_OUT4 connect output terminals of the output buffers BUF3 and BUF4 to an odd output terminal OUTPUT<odd> and an even output terminal OUTPUT<even>, which are connected to another data line.

The output switches SW_OUT1, SW_OUT2, SW_OUT3 and SW_OUT4 are configured to be turned off by the control unit in the time periods t2 and t3 in which the unclear data may be inputted. Therefore, it is impossible to prevent unclear noisy data from being inputted and displayed on the LCD panel in the time periods t2 and t3.

However, in case where the output switches SW_OUT1, SW_OUT2, SW_OUT3 and SW_OUT4 are simply turned off in the time periods t2 and t3, slight noisy images may be displayed by the data voltage which remains unequally on the data line.

To prevent this phenomenon, in this embodiment, all of the charge sharing switches SW_CS1, SW_CS2, SW_CS3 and SW_CS4 are turned off under the control of the control unit. Therefore, the respective data lines connected to the plurality of odd output terminals OUTPUT<odd> and the plurality of even output terminals OUTPUT<even> are connected and charge-shared. Consequently, it is possible to more completely prevent noisy images from being displayed in the time periods t2 and t3. Moreover, images having clear colors can be displayed.

Although the technology which can prevent the display of the noisy images through charge sharing by connecting the respective data lines in the time periods t2 and t3 is applied to a cross structure in which the output switches SW_OUT1 and SW_OUT2 selectively receive the output signals of the output buffers BUF1 and BUF2, and the output switches SW_OUT3 and SW_OUT4 selectively receive the output signals of the output buffers BUF3 and SW_OUT4, the present invention is not limited thereto. For example, the same effect can be obtained when the above-described technology is applied to a structure in which the output signals of the output buffers BUF1 to BUF4 and the output switches SW_OUT1 to SW_OUT4 are connected in 1:1 correspondence.

As is apparent from the above description, the present invention provides a source driver circuit for an LCD, which can completely prevent the display of noisy inferior images by forcibly supplying a voltage of a specific level to a data line until valid data is provided to an LCD panel through the data line immediately after power is turned on.

Furthermore, in the LCD, the output terminals of the output buffers connected to the data lines are opened until the valid data is inputted to the LCD panel through the data lines immediately after power is turned on, and the charge sharing is achieved by connecting the respective data lines. In this manner, the display of noisy inferior images can be completely prevented.

Consequently, the degradation in the reliability of products can be prevented.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A source driver circuit for a liquid crystal display, comprising:

a power supply voltage input unit in communication with a first power supply voltage and a second power supply voltage, the power supply voltage unit configured to divide the first power supply voltage and the second power supply voltage at a first time when the second power supply voltage is maintained at a middle level into a lower division voltage and an upper division voltage respectively, such that the middle level of the second power supply voltage is lower than a level of the lower division voltage;

a power supply voltage comparison unit in communication with the power supply voltage unit, the first power supply voltage and the second power supply voltage, the power supply voltage comparison unit configured to receive and to compare the lower division voltage and the upper division voltage and to output an output voltage of a high level in the first time period in which the lower division voltage is higher than the upper division voltage;

a Schmitt trigger in communication with the power supply voltage comparison unit, the Schmitt trigger configured to receive the output voltage of the high level and to maintain a stable waveform of a reset signal during the first time period without responding to external noise;

a specific voltage supply unit in communication with the Schmitt trigger and a gate start pulse, the specific voltage supply unit configured to receive the reset signal and to output a voltage of a specific level in a second time period after the first time period and a third time period after the second time period until receiving a first gate start pulse at a fourth time period after the third time period; and an output buffer unit in communication with the specific voltage supply unit and a valid data source, the output buffer unit configured to receive and to output the voltage of the specific level to a data line of a liquid crystal display panel immediately after power is turned on during the second and third time periods and to output valid data to the data line during the fourth time period.

2. The source driver circuit according to claim 1, wherein the first power supply voltage comprises VCC, a power supply voltage that drives a logic circuit of the source driver and the second power supply voltage comprises VDD, a power supply voltage that drives the source driver.

3. The source driver circuit according to claim 1, wherein the power supply voltage input unit comprises:

an upper PMOS transistor in communication with the second power supply voltage and an upper power-down signal, the upper PMOS transistor configured to be turned on in response to upper power-down signal and transfer the second power supply voltage;

an upper division voltage output section in communication with the upper PMOS transistor, the upper division voltage output section configured to divide the second power supply voltage at a predetermined resistance ratio, and output the upper division voltage;

a lower PMOS transistor in communication with the first power supply voltage and a lower power-down signal, the lower PMOS transistor configured to be turned on in response to the lower power-down signal and transfer the first power supply voltage; and a lower division voltage output section in communication with the lower PMOS transistor, the lower division voltage output section configured to divide the first power supply voltage at a predetermined resistance ratio, and output the lower division voltage.

4. The source driver circuit according to claim 3, wherein the upper division voltage output section sets the predetermined resistance ratio such that the middle level of the second power supply voltage is lower than the level of the lower division voltage.

5. The source driver circuit according to claim 1, wherein the power supply voltage comparison unit comprises:

an enable section in communication with the first power supply voltage and the lower power-down signal, the enable section configured to change from a standby mode to an enable mode in response to the lower power-down signal during the first time period;

a comparison section in communication with the enable section, the upper division voltage and the lower division voltage, the comparison section configured to be supplied with the first power supply voltage through the enable section, to compare the lower division voltage with the upper division voltage, and to output the output voltage according to the comparison result; and a load section in communication with the comparison section, the load section configured to allow the output voltage to be generated from the comparison section.

6. The source driver circuit according to claim 1, wherein the output buffer unit is configured to receive the specific voltage and the valid data through a common input terminal, or selectively receive the specific voltage and the valid data through a switch.

7. The source driver circuit according to claim 1, further comprising a MOS transistor in communication with the output voltage of the power supply voltage comparison unit, the lower power-down signal and ground, the MOS transistor configured to be turned on in response to the lower power-down signal received after the third time period and to mute the output voltage of the power supply voltage comparison unit to ground.

* * * * *